(12) United States Patent
Nainar et al.

(10) Patent No.: US 12,137,125 B2
(45) Date of Patent: Nov. 5, 2024

(54) CLASSIFICATION-BASED DATA PRIVACY AND SECURITY MANAGEMENT

(71) Applicant: Cisco Technology, Inc., San Jose, CA (US)

(72) Inventors: Nagendra Kumar Nainar, Morrisville, NC (US); Vinay Saini, Karnatka (IN); Akram Sheriff, Newark, CA (US); Rajesh Indira Viswambharan, Karnataka (IN); David John Zacks, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 103 days.

(21) Appl. No.: 17/886,030

(22) Filed: Aug. 11, 2022

(65) Prior Publication Data
US 2024/0056488 A1  Feb. 15, 2024

(51) Int. Cl.
*H04L 9/40* (2022.01)
(52) U.S. Cl.
CPC ........ *H04L 63/205* (2013.01); *H04L 63/0478* (2013.01)
(58) Field of Classification Search
CPC ... H04L 63/205; H04L 63/0478; H04L 63/20; H04L 63/0485; H04L 63/06; H04L 63/064; H04L 9/40
See application file for complete search history.

(56) References Cited

U.S. PATENT DOCUMENTS

| | | |
|---|---|---|
| 2012/0266218 A1 | 10/2012 | Mattsson |
| 2016/0315920 A1 | 10/2016 | Kurmala et al. |
| 2016/0359622 A1 | 12/2016 | Bunch et al. |
| 2019/0354685 A1 | 11/2019 | Tomasso et al. |
| 2020/0110908 A1* | 4/2020 | Hulton .................. G06F 21/602 |
| 2021/0227268 A1* | 7/2021 | Di Pietro ......... H04N 21/23476 |
| 2021/0256162 A1 | 8/2021 | Liphardt et al. |
| 2021/0377727 A1* | 12/2021 | Kanagasabai ........... H04W 8/24 |

\* cited by examiner

*Primary Examiner* — Quazi Farooqui
(74) *Attorney, Agent, or Firm* — Lee & Hayes, P.C.

(57) ABSTRACT

Techniques are described for classification-based data security management. The classification-based data security management can include utilizing device and/or data attributes to identify security modes for communication of data stored in a source device. The security modes can be identified based on a hybrid-encryption negotiation. The attributes can include a device resource availability value, an access trust score, a data confidentiality score, a geo-coordinates value, and/or a date/time value. The security modes can include a hybrid-encryption mode. The source device can utilize the hybrid-encryption mode to transmit the data, via one or more network nodes, such as an edge node, to one or more service nodes.

20 Claims, 7 Drawing Sheets

CLASSIFICATION-BASED DATA PRIVACY AND SECURITY MANAGEMENT

TECHNICAL FIELD

The present disclosure relates generally to, among other things, classification-based data security management that leverages various factors associated with the data for encryption and decryption of the data by various network devices.

BACKGROUND

The number and variety of devices throughout the world that are connected together continue to increase with widespread implementation of internet of everything (IoE). Devices of different types may have different respective data communication functionalities and/or requirements. Capabilities of some devices, such as sensors and/or various types of internet-of-things (IOT) devices, may be based on compute and/or power resources of the devices, which may be required to operate with great reliability and without interruption for extended periods of time. Privacy and security operations may be performed by the devices to protect data utilized for various purposes, such as managing information associated with users, environments, and/or businesses. Encryption and decryption of data communicated by the devices may be utilized to preserve data confidentially.

To accomplish this type of data security, service providers may implement a zero-trust encryption policy for a partial or entire portion of the communicated data. However, this traditional universal data encryption functionality does not enable management of different types of data encryption and decryption. In general, service providers are unable to identify and utilize information associated with data to customize and trigger security policies/modes for communicating the data.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
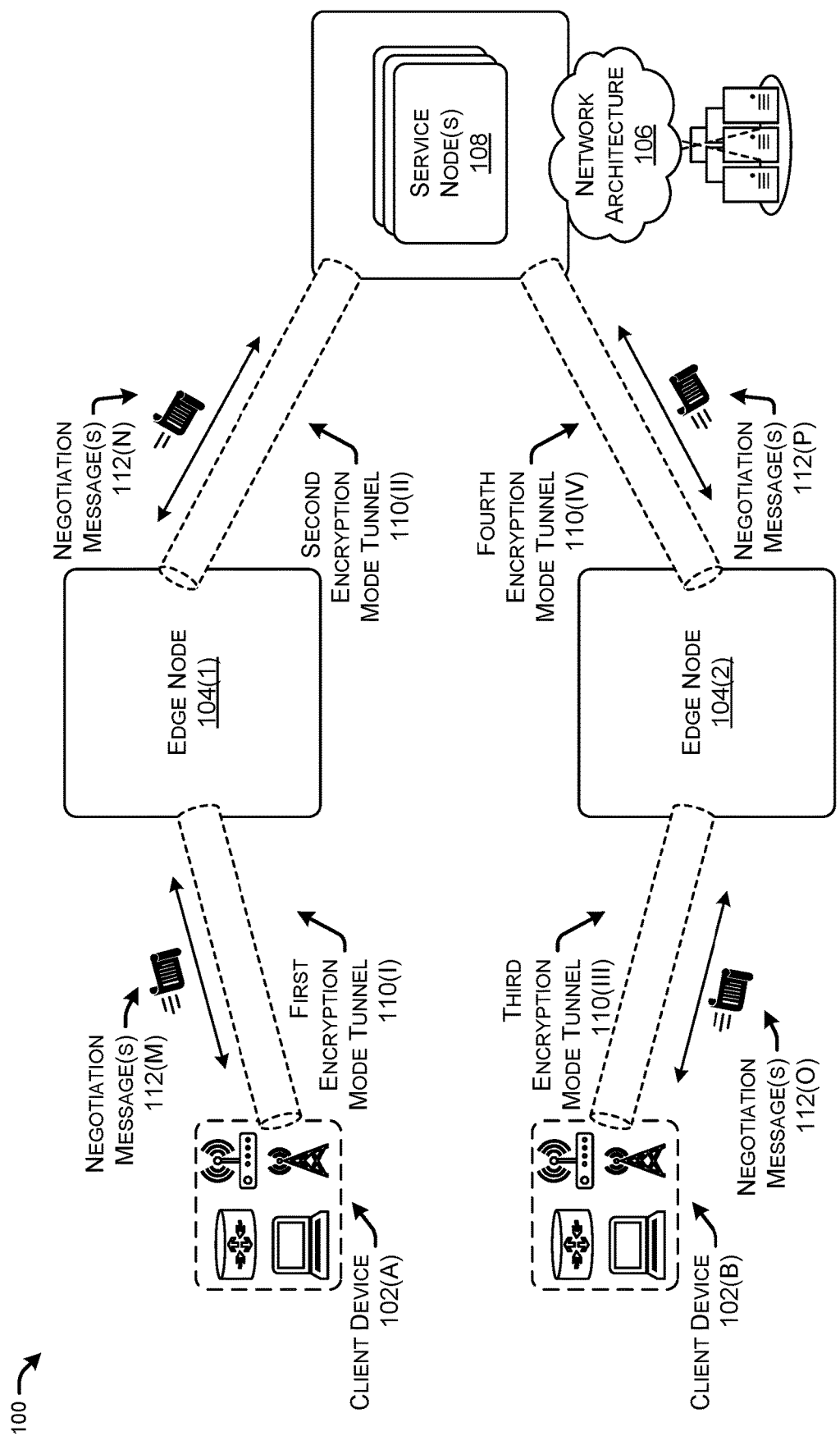
FIG. 1 illustrates an example environment for classification-based data security management.

This disclosure describes various techniques for classification-based data security management. An example method can include identifying whether communications for a source device are to be exchanged and performing analysis based on the communications and the source device. The analysis can include identifying attributes utilized to identify security modes for communication of the data. For instance, the security modes can include one or more different types of encryption modes utilized to encrypt the data to be transmitted. The attributes can include a device resource availability value, an access trust score, a data confidentiality score, a geo-coordinates value, and/or a date/time value. The encryption modes can include a full-encryption mode, a minimal-encryption mode, a hybrid-encryption mode, and/or any other type of encryption mode. The source device can utilize the encryption mode to transmit the data, via one or more network nodes, such as an edge node, to one or more service nodes.

Additionally, the techniques described herein may be performed by a system and/or device having non-transitory computer-readable media storing computer-executable instructions that, when executed by one or more processors, performs the method described above.

Example Embodiments

As discussed above, service providers generally leverage encryption and decryption of data being transmitted to ensure confidentiality of the data. In some examples, security modes can be utilized, based on attributes associated with a device and/or data being transmitted by the device, to transmit the data. The attributes can include a device resource availability value, an access trust score, a data confidentiality score, a geo-coordinates value, and/or a date/time value. The security modes can be established for a device and/or a portion of data being transmitted by the device. The security modes can be established based on characteristics associated with the device and/or data being transmitted by the device. The characteristics, which can include a type of the device and/or a type of the data, can be predetermined and/or dynamically-determined. The security modes can be utilized to transmit the data based on security keys, which can be generated at one or more network nodes (e.g., an access node, a service node, and/or one or more other network node).

In various examples, the attributes and/or the characteristics associated with the device and/or the data being transmitted can enable service providers to customize (or "trigger") the security modes utilized to transmit the data. By identifying different security modes associated with different devices and/or different data segments, different types of security policies can be utilized for data protection. The types of security policies, which can be associated with encryption and/or decryption of the data, can include a type of security policy with a level of protection for a type of device and/or a type of data that meets or exceeds another type of security policy with another level of protection for another type of device and/or another type of data.

Implementations of the present disclosure solve specific problems in the field of computer networking. For example, source devices, such as sensors and/or various types of internet-of-things (IOT) devices, can identify customized security policies to transmit data. The security policies can include security modes (e.g., a full-encryption mode, a minimal-encryption mode, a hybrid-encryption mode, and/or any other type of encryption mode) for encryption and/or of the data, and corresponding decryption modes (e.g., a full decryption mode, a minimal decryption mode, a hybrid decryption mode, and/or any other type of decryption mode). The security modes can be implemented with individual ones of the encryption modes being integrated together with the corresponding decryption modes, or with the encryption modes being separate from the corresponding decryption modes (e.g., decryption modes being identified/customized/triggered in a similar way as for the encryption modes). The security modes can utilize levels of protection for types of devices and/or types of data that meet or exceed other levels of protection for other types of devices and/or other types of data. By customizing the security policies/modes, consumption of resources, such as network resources and/or compute resources, associated with source devices and/or destination devices can be optimized. The source devices and/or destination devices can allocate and/or re-allocate the resources, which would otherwise have been expended according to conventional techniques, for other purposes.

Furthermore, for example, network devices that communicate the data transmitted by the source devices utilizing the customized security modes may perform operations more efficiently. The network devices can identify the security policies and utilize the security modes for data communication. The security modes for encryption and/or decryption that are utilized by the network devices can be the same as, or different from, the security modes utilized by the corresponding source devices and/or the corresponding destination devices. Different security keys can be generated by different network devices based on the security policies. By customizing the security policies, including data encryption/decryption and/or security key generation, the resources consumed by the network devices can be optimized. Optimization of the resources, such as network resources and/or compute devices, can enable the network devices to operate more efficiently than would otherwise be the case for conventional techniques. The network devices can allocate and/or re-allocate the resources, which would otherwise have been expended according to conventional techniques, for other purposes.

Various implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 for classification-based data security management. The environment 100 includes one or more client devices 102 (e.g., a client device 102(A), a client device 102(B), etc.), one or more edge nodes (or "access node(s)") 104 (e.g., an edge node 104(1), an edge node 104(2), etc.), and a network architecture 106, which can include one or more service nodes 108. The client device(s) 102, the edge node(s) 104, and the network architecture 106 (e.g., the service node(s) 108) can be communicatively interconnected via one or more networks.

Generally, the network architecture 106 may include devices (e.g., devices utilized to implement the service node(s) 108) housed or located in one or more data centers that may be located at different physical locations. For instance, the network architecture 106 may be supported by the network(s) (e.g., network(s) of devices) in a public cloud computing platform, a private/enterprise computing platform, and/or any combination thereof. The data center(s) may be physical facilities or buildings located across geographic areas designated to store networked devices that are part of the network architecture 106. The data center(s) may include various networking devices, as well as redundant or backup components and infrastructure for power supply, data communications connections, environmental controls, and various security devices. In some examples, the data center(s) may include one or more virtual data centers which are a pool or collection of cloud infrastructure resources specifically designed for enterprise needs, and/or for cloud-based service provider needs. Generally, the data center(s) (physical and/or virtual) may provide basic resources such as processor (CPU), memory (RAM), storage (disk), and networking (bandwidth). However, in some examples the devices in the network architecture 106 may not be located in explicitly defined data center(s). In those examples, the devices may be located in other locations or buildings.

The network architecture 106 may be accessible to the client device(s) 102 over the network(s), such as the Internet. The network architecture 106, and the network(s), may each respectively include the network(s), which may be implemented by any viable communication technology, such as wired and/or wireless modalities and/or technologies. The network architecture 106 and the networks(s) may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network architecture 106 may include devices, virtual resources, or other nodes that relay packets from one network segment to another by nodes in the computer network.

The client device(s) 102, the edge node(s) 104, and the service node(s) 108 can be communicatively interconnected via one or more encryption mode tunnels (or "tunnels) 110, which can be generated utilizing the network(s). In some examples, the tunnel(s) can include a tunnel (e.g., a first tunnel) 110(I) established between the client device 102(A) and the edge node 104(1), a tunnel (e.g., a second tunnel) 110(II) established between the edge node 104(1) and the service node(s) 108, a tunnel (e.g., a third tunnel) 110(III) established between the client device 102(B) and the edge node 104(2), and/or a tunnel (e.g., a fourth tunnel) 110(IV) established between the edge node 104(2) and the service node(s) 108.

The client device(s) 102, the edge node(s) 104, and the service node(s) 104 can perform negotiation (e.g., hybrid-encryption support negotiation) (or "hybrid-encryption negotiation") via one or more negotiation messages 112 to identity security modes (e.g., encryption/decryption modes). The negotiation can be utilized to identify and generate the tunnel(s) 110. In some examples, the tunnel 110(1) can be established based on negotiation via one or more negotiation messages 112(M) communicated between the client device 102(A) and the edge node 104(1), the tunnel 110(II) can be established based on negotiation via one or more negotiation messages 112(N) communicated between the edge node 104(1) and the service node(s) 108, the tunnel 110(IIO) can be established based on negotiation via one or more negotiation messages 112(O) communicated between the client device 102(B) and the edge node 104(2), and the tunnel 110(IV) can be established based on negotiation via one or more negotiation messages 112(P) communicated between the edge node 104(2) and the service node(s) 108.

One or more security policies can be utilized for communication with the client device(s) 102. The security policy(ies) can be established utilizing information (e.g., one or more attributes (e.g., a resource availability value, an access trust score, a data confidentiality score, geo coordinates, and/or a time/date value) and/or one or more characteristics (e.g., a type of the device and/or a type of the data)) associated with the client device(s) 102 and/or a segment of data (or "data segment" or "data") (e.g., data to be communicated for the client device(s) 102). By way of example, a security policy can be established for communication with the client device 102(A). The security policy (e.g., a first security policy) can include one or more security modes. The security mode(s) can include a security mode (e.g., a first security mode) associated with communication between the client device 102(A) and the edge node 104(1), and a security mode (e.g., a second security mode) associated with communication between the edge node 104(1) and the service node(s) 108. Data can be communicated between the client device 102(A) and the service node(s) 108, via the edge node 104(1) by utilizing the security policy (e.g., the first security mode and/or the second security mode). The first security mode can be the same as, or different from, the second security mode.

Although the security policy utilized for the client device 102(A) can include the first and second security modes as discussed above in the current disclosure, it is not limited as such. Individual ones of any number of security modes (e.g., encryption/decryption modes) utilized for communication between any nodes/devices can be identified/established via the security policy, in a similar way as for the first and second security modes.

The security policy(ies) can include a static security policy and/or a dynamic security policy. In some examples, the security policy(ies) can include the static security policy being established based on a type of a device (e.g., a type of the client device 102(A)) and/or a type of data that the client device 102(A) will be producing/communicating. In those examples, the static security policy can be established and utilized for one or more data segments transmitted by the client device 102(A). The static security policy can be utilized to conserve device resources and optimize data communication since the type of security to be utilized for data communication is predetermined. In some examples, the security policy(ies) can include the dynamic security policy being established by the service node(s) 108 as a dynamic profile learning (DPL) security policy (e.g., the security policy being determined in real-time or near real-time, as communication of the data segment is being performed) based on a location of the client device 102(A), based on different types of data (e.g., communicated data being triggered, data being communicated based on a timer signal, etc.) being communicated, and/or based on different times at which data is communicated. The dynamic security policy can be utilized to optimize the level of security for different data segments, since a higher level of security can be utilized for data (e.g., usernames, passwords, other user login data, other account data, etc.) for which confidentiality is of a greater concern than a level of security for other data (e.g., sensor measurements, etc.).

The security policy can include individual ones of one or more security modes with corresponding levels of encryption. In some examples, the security mode(s) can include an encryption mode with encryption (e.g., minimal encryption) of a level for communication of data for the client device 102(A). In other examples, the security mode(s) can include an encryption mode with encryption (e.g., intermediate-encryption) of a level for communication of data for the client device 102(A). In other examples, the security mode(s) can include an encryption mode with encryption (e.g., full-encryption) of a level for communication of data for the client device 102(A). The encryption level for full-encryption may be greater than or equal to the encryption level for intermediate-encryption, which may be greater than or equal to the encryption level for minimal-encryption.

In some examples, performance of resource intensive encryption can be avoided for the client device(s) 102(A) by customizing encryption for communication between the client device 102(A) and the edge node 104(1) to be the minimal-encryption. The attribute(s) and the characteristic(s) can be utilized to enable the client device(s) 102(A) (e.g., devices such as sensor, IOT devices, etc.) of various types to operate optimally and efficiently. In some examples, protection of data requiring a higher level of security (e.g., usernames, passwords, other user login data, other account data, etc.) can be optimized by utilizing a relatively higher level of encryption (e.g., full-encryption).

Any encryption type (e.g., data encryption standard (DES) encryption, advanced encryption standard (AES) encryption, rivest-shamir-adleman (RSA) encryption, etc.) can be utilized to establish encryption of any level. In some examples, the level of encryption, such as the encryption level for minimal-encryption, can be less than the encryption level for intermediate-encryption and/or full-encryption based on the minimal-encryption having a type of encryption (e.g., DES encryption) that is weaker or less robust, and therefore, less resource-intensive, than for the encryption type (e.g., AES encryption) for other encryption (e.g., the intermediate-encryption and/or full-encryption). In other examples, the encryption level of the minimal-encryption can be less than the encryption level for intermediate-encryption and/or full-encryption based on the minimal-encryption having the same type of encryption as for the intermediate-encryption and/or full-encryption, except with the type of encryption for the minimal-encryption being established with weaker or less robust encryption characteristics (e.g., AES encryption using blocks of 128-bit size) than for the encryption type (e.g., AES encryption using blocks of 192-bit size, or blocks of 256 bit-size) for other encryption (e.g., the intermediate-encryption and/or full-encryption). Encryption levels can be established in a similar way for encryption utilized for any of the network(s) between any combination of any devices/nodes (e.g., the client device(s) 102, the edge node(s) 104, and the service node(s) 108).

The security policy can include encryption of the same level, or different levels, for communication between the client device(s) 102 and the edge node(s) 104, and for communication between the edge node(s) 104 and the service node(s) 108. In some examples, the security policy can include encryption (e.g., minimal encryption, intermediate-encryption, or full-encryption) of the same level for communication between the client device(s) 102 and the edge node(s) 104, and for communication between the edge node(s) 104 and the service node(s) 108. In some examples, the security policy can include encryption (e.g., hybrid-encryption) of different levels for communication between the client device(s) 102 and the edge node(s) 104, and for communication between the edge node(s) 104 and the service node(s) 108. In those examples, for instance with an encryption level to be established for the tunnel 110(I) being less than the encryption level to be established for the tunnel 110(II), the security policy utilizing hybrid-encryption can include encryption (e.g., minimal-encryption) of a level for communication between the client device(s) 102 and the edge node(s) 104, and encryption (e.g., full-encryption) of another level for communication between the edge node(s) 104 and the service node(s) 108. By way of example, the full-encryption can be utilized for communication between the edge node 104(1) and the service node(s) 108, based on a security risk being greater for communication between the edge node 104(1) and the service node(s) 108 than for communication between the client device 102(A) and the edge node 104(1).

The security policy that is identified can be utilized to communicate different portions (e.g., a partial portion or an entire portion) of data at the same level, or different levels, of encryption. In some examples, a partial portion of data (e.g., a data segment, including data to be transmitted by the client device 102(A)) (e.g., a portion of a payload) from among data stored in the client device 102(A) can be transmitted utilizing encryption of a level (e.g., full-encryption), and another partial portion (e.g., a remaining portion) (e.g., another portion of the payload) of the data segment can be transmitted utilizing encryption of another level (e.g., hybrid-encryption). The security policy can be established/managed mid-stream in communication of the data segment (e.g., payload), and/or prior to communication of any portion of the data segment.

Although the encryption level established for communications between the client device 102(A) and the edge node 104(1) can be customized to be less than the encryption level established for communications between the edge node 104(1) and the service node(s) 108, as discussed in the current disclosure, it is not limited as such. In some examples, any encryption level for communication between any nodes/devices can be greater than, less than, or equal to any encryption level for communication between any other nodes/devices. By way of example, the encryption level established for communications between the edge node 104(1) and the service node(s) 108 can be customized to be less than the encryption level established for communications between the client device 102(A) and the edge node 104(1).

In some examples, the edge node 104(1) (e.g., an encryption function of the edge node 104(1) can establish/manage any portion of identification/customization of the security policy(ies) by snooping control plane requests (e.g., data communication requests received from the client device 102(A)). In those examples, reasoning logic may be integrated in the edge node 104(1). The edge node 104(1) can identify the control plane request is for minimal encryption irrespective of a destination address, and terminate the control plane request and/or a communication session (e.g., communications being performed by the client device 102(A)). The encryption function can act as a proxy to snoop the control plane request, terminate the control plane request, create a new communication session to the service node(s) 108, and then stitch together the initial communication session and the new communication session. This can allow the edge node 104(1) to modify the security policy (e.g., the security mode(s)) utilized to communicate the data transmitted by the client device 102(A).

In some examples, the full-encryption can be utilized as a default, and a security policy (e.g., a new security policy) that is identified can be utilized to modify the full-encryption (e.g., full-encryption for communication between the client device(s) 102, the edge node(s) 104, and the service node(s) 108) to be hybrid-encryption (e.g., minimal-encryption for communication between the client device(s) 102 and the edge node(s) 104, and full-encryption for communication between the edge node(s) 104 and the service node(s) 108). In other examples, the hybrid-encryption (e.g., minimal-encryption for communication between the client device(s) 102 and the edge node(s) 104, and full-encryption for communication between the edge node(s) 104 and the service node(s) 108) can be utilized to transmit an entire portion of the data segment (e.g., all of the data segment can be transmitted utilizing the hybrid-encryption, based on the entire portion of the data segment being transmitted after identification of the security policy).

Although the security policy for the client device 102(A) can be established as discussed above in the current disclosure, it is not limited as such. In some examples, any security policy (e.g., a second security policy) associated with any of one or more of the client device(s) 102 (e.g., the client device 102(B)) can be established in a similar way as for the client device 102(A). Establishment of any of one or more of the security policy(ies) and/or any of one or more of the security mode(s) can overlap (e.g., partially or entirely overlap) in time and/or can occur in any order. Establishment of any security policy can be performed at a time of registration of a node/device or any time at which data is to be transmitted by node/device (e.g., the client device 102(A). Any security policy can be updated based on changes in the attribute(s), the characteristic(s), and/or any of the nodes/devices. By way of example, the security policy (e.g., any of the corresponding security mode(s)) can be modified based on an upgrade (e.g., a software/firmware) upgrade to a node/device, a modification in a total amount of data being transmitted, a modification in individual amounts of corresponding types of corresponding portions of data being transmitted, a modification in a type of one or more corresponding portions of data being transmitted, etc. Any of the security policy(ies) can be established/modified based on a signature message and/or a heartbeat message transmitted by a node/device (e.g., the client device 102(A).

In some examples, although the client device(s) 102 can be coupled (or "communicatively coupled," or "connected," or "communicatively connected") to the service node(s) 108 via the edge node(s) 104 as discussed above in the current disclosure, it is not limited as such. In some examples, the client device(s) 102 can be coupled to the service node(s) 108 via the edge node(s) 104 and/or one or more other nodes (e.g., node(s) of a same, or different type), or coupled to the service node(s) 108 without any of the intermediary nodes (e.g., with one or more network nodes, but without any of the edge node(s) 104). In those examples, the security mode(s) can be established in a similar way as for the security mode being established for communications utilizing the client device 102(A), the edge node 104(1), and the service node(s) 108.

Although the security policy can be established/customized for the tunnels 110(I), 110(II), 110(III), and 110(IV), as discussed above in the current disclosure, it is not limited as such. Individual ones of any of the tunnels (e.g., one or more of the tunnel(s) 110) can be established/triggered/customized/modified, in a similar way as for the security policy(ies) according any of the techniques discussed herein.

Although the tunnel(s) 110 (e.g., the tunnel 110(I)) can be established based on the corresponding negotiation message(s) 112 (e.g., the negotiation message(s) 112(M)) as discussed above in the current disclosure, it is not limited as such. In some examples, any of one or more of the client device(s) 102, the edge node(s) 104, and the service node(s) 104 can be coupled to any other of one or more of the client device(s) 102, the edge node(s) 104, and the service node(s) 104 by utilizing one or more tunnels and/or one or more negotiation messages. In those or other examples, any of one or more of the client device(s) 102, the edge node(s) 104, and the service node(s) 104 can be coupled to any other of one or more of the client device(s) 102, the edge node(s) 104, and the service node(s) 104 by utilizing any of one or more other techniques not utilizing any tunnel. In those or other examples, individual ones of the tunnel(s) 110 (e.g., the tunnel 110(I)) can be established by any of the negotiation message(s) 112 (e.g., the negotiation message(s) 112 (M), the negotiation message(s) 112(N), etc.), the corresponding client device 102 (e.g., the client device 102(A)), the corresponding edge node 104(1), the corresponding service node(s) 108, and/or any information (e.g., the attribute(s) and/or the characteristic(s)) associated with the data to be transmitted by the corresponding client device 102. In those or other examples, for instance without one or more of the tunnel(s) 110 being utilized, any of the encryption/decryption modes associated with data communicated between any nodes/devices can be identified/customized, via identification of the security policy (e.g., the security mode(s)), and utilized to communicate data with or without any tunnel (e.g., any of the tunnel(s) 110). In those examples, the encryption/decryption modes can be identified/customized in a similar way as for the corresponding tunnel(s) 110.

Although the security policy can include hybrid-encryption for data communication as discussed above in the current disclosure, it is not limited as such. In some examples, minimal-encryption, full-encryption, or any other type of encryption can be utilized, instead of hybrid-encryption, for communication of data in the client device(s) 102. In those examples, the security policy can be include minimal-encryption for data communicated between the client device 102(A) and the edge node 104(1), and between the edge node 104(1) and the service node(s) 108. In other examples, the security policy can be include full-encryption for data communicated between the client device 102(A) and the edge node 104(1), and between the edge node 104(1) and the service node(s) 108.

Although the term "node" is utilized in various occurrences, such as with respect to the edge node(s) 104 and the service node(s) 108, as discussed above in the current disclosure, it is not limited as such. Any occurrences of the term "node" can be interpreted as one or more nodes being implemented, individually or in combination, as one or more devices (e.g., computing device(s)).

Figure 2:
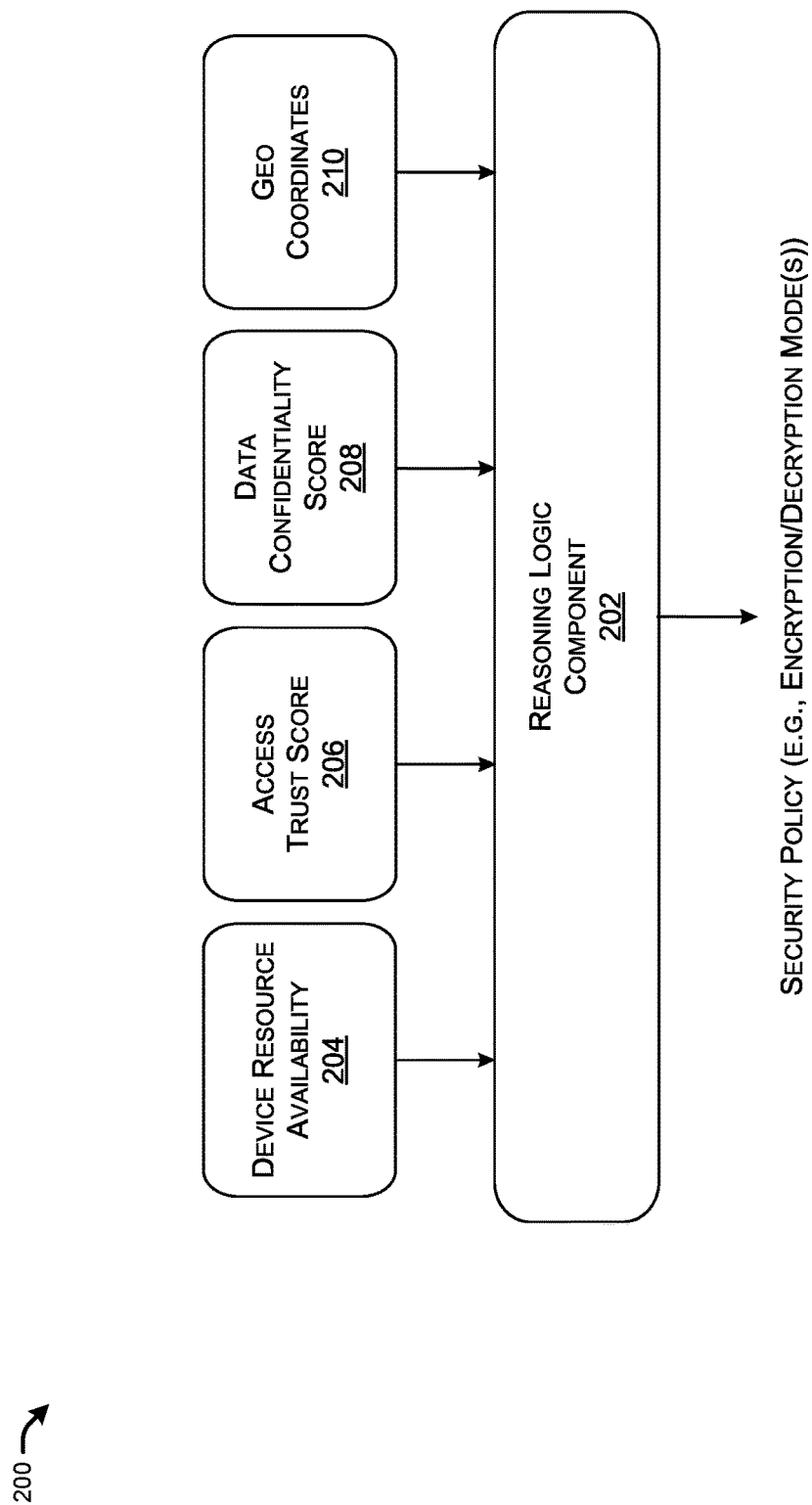
FIG. 2 illustrates an example environment utilizing reasoning logic for classification-based data security management.

FIG. 2 an example environment 200 utilizing reasoning logic for classification-based data security management. The environment 200 can include a reasoning logic component 202.

The reasoning logic component 202 can receive information (e.g., one or more attributes and/or one or more characteristics) associated with the client device(s) 102, as discussed above with reference to FIG. 1, and/or data being communicated for the client device(s) 102. In some examples, the reasoning logic component 202 can be utilized to establish the security policy for the client device 102(A). In those examples, the reasoning logic component 202 can be integrated within any of the client device 102(A), the edge node 104(1), and the service node(s) 108 (e.g., any of one or more of the service node(s) 108), as discussed above with reference to FIG. 1. In alternative or additional examples, a portion (e.g., a partial or entire portion) of the reasoning logic component 202 can be implemented by a combination of one or more of the client device 102(A), the edge node 104(1), and the service node(s) 108 (e.g., any of one or more of the service node(s) 108).

The reasoning logic component 202 can utilize one or more negotiation messages (e.g., one or more of the negotiation message(s) 112, as discussed above with reference to FIG. 1). The negotiation message(s) 112 can be utilized by the reasoning logic component 202 to identify the attribute(s) and/or the characteristic(s), and/or to identify one or more individual security policies for corresponding node(s)/device(s) (e.g., any of the client device(s) 102, the edge node(s) 104, the service node(s) 108, etc.) based on the attributes and/or one or more characteristics.

In some examples, for instance with the reasoning logic component 202 being integrated within the edge node 104 (1), the edge node 104(1) can utilize the negotiation message(s) 112(M) communicated between the client device 102(A) and the edge node 104(1), to receive and identify information (e.g., the attribute(s) and/or the characteristic(s), as discussed above with reference to FIG. 1) associated with the client device 102(A), the edge node 104(1), and/or network(s) between the client device 102(A) and the edge node 104(1). In those or other examples, the edge node 104(1) can utilize the negotiation message(s) 112(N) to receive and identify the attribute(s) and/or the characteristic(s) associated with the edge node 104(1), the service node(s) 108, and/or network(s) between the edge node 104(1) and the service node(s) 108. In those or other examples, the edge node 104(1) can identify the security policy, including a security mode (e.g., encryption of a type) associated with communication between the client device 102(A) and the edge node 104(1), and/or a security mode (e.g., encryption of a type) associated with communication between the edge node 104(1) and the service node(s) 108.

Although the security mode for communication between the client device 102(A) and the edge node 104(1) can be established, and the security mode for communication between the edge node 104(1) and the service node(s) 108 can be established, as discussed above in the current disclosure, it is not limited as such. In some examples, the term "security mode" can be utilized to refer to encryption/decryption performed for communication between the client device 102(A) and the edge node 104(1), and for communication between the edge node 104(1) and the service node(s) 108. In those examples, the term "security mode" can refer to communication for the client device 102(A), the edge node 104(1), and the service node(s) 108, as a same security mode; or the term "security mode" can refer to individual ones of different security modes of different types of encryption/decryption for communication between node(s)/device(s) (e.g., between the client device 102(A) and the edge node 104(1), or between the edge node 104(1) and the service node(s) 108).

The device resource availability value 204 can be associated with availability of various device resources. The device resource availability value 204 can indicate one or more amounts and/or types of one or more device resources (e.g., compute resources, network resources, storage resources, etc.) that are available (e.g., the device resource availability value 204 can be implemented as a value, or as an array of one or more values for corresponding device(s)/node(s)). In some examples, the amount(s) of available resource(s) can include an amount of available resources (e.g., individual amounts of resources of different types) for performance of data communication (e.g., encryption, transmission, etc.) by corresponding devices (e.g., the client device 102(A), the edge node 104(1), the service node(s) 108, etc.). By way of example, an amount of the device resource availability value 204 indicating available resources (e.g., a first available resources amount) capable of performing one or more security operations by the client device 102(A) may be less than another amount of the device resource availability value 204 indicating other (e.g., a second available resources amount) (e.g., an amount with a relatively higher value than for the first available resources amount) of available resources capable of performing one or more other security operations (e.g., a higher complexity security operation) by the edge node 104(1).

The access trust score 206 can be associated with a potential security risk of a cyberattack. The access trust score 206 can indicate one or more likelihoods of one or more security attacks (e.g., the access trust score 206 can be implemented as a score, or as an array of one or more scores for corresponding device(s)/node(s)). In some examples, the likelihood(s), which can include a likelihood associated with a security attack to the client device 102(A) and/or the network(s) to which the client device 102(A) is connected, may be utilized to predict unknown attack vectors for exploiting one or more cybersecurity vulnerabilities of the client device 102(A). In those or other examples, the likelihood(s), which can include a likelihood associated with a security attack to the edge node 104(*a*) and/or the network(s) to which the edge node 104(1) is connected, may be utilized to predict unknown attack vectors for exploiting one or more cybersecurity vulnerabilities of the edge node 104(1) and/or the network(s) to which the edge node 104(1) is connected. An amount of the access trust score value 206 indicating a potential security risk (e.g., a first potential security risk amount) associated with the client device 102(A) can be set to be less than for another potential security risk (e.g., a second potential security risk amount) (e.g., an amount with a relatively higher value than for the first potential security risk amount) associated with the edge node 104(1).

The data confidentiality score 208 can be associated with a level of confidentiality of the data being communicated. The data confidentiality score 208 can indicate one or more confidentiality levels. In some examples, the confidentiality level(s) can include a confidentiality level associated with data stored in the client device 102(A). An level (e.g., a first data confidentiality level) of confidentiality associated with data may be greater than another level (e.g., a second data confidentiality level) (e.g., a level a lower value than for the first data confidentiality level) of confidentiality of other data. In some examples, such as for an instance in which a confidentiality level (e.g., a first confidentiality level) associated with a portion of the data is greater than one or more confidentiality levels (e.g., a second confidentiality level) associated with one or more other portions of the data, the data confidentiality score 208 can be set for a data segment (e.g., a payload) based on the first confidentiality level to ensure protection of the data with the highest level of confidentiality.

The geo coordinates value 210 can be associated with geo coordinates indicating a device/node location. The geo coordinates value 210 can include one or more sets of geo coordinates for locations from which the data is to be transmitted (e.g., the geo coordinates value 210 can be implemented as a set of geo coordinates, or as an array of one or more sets of geo coordinates for corresponding device(s)/node(s). In some examples, the set(s) of geo coordinates can include a set of geo coordinates indicating a location of the client device 102(A). In those or other examples, the set(s) of geo coordinates can include a set of geo coordinates indicating a location of the edge node 104(1). One or more distances (e.g., first distance(s)) from the location (e.g., the first location) of the client device 102(A) indicated by the set of geo coordinates and to the edge node 104(1) and/or the service node(s) 108 may be lesser than one or more other distances (e.g., second distance(s)), respectively, from another location (e.g., a second location) of another client device indicated by another set of geo coordinates and to the edge node 104(1) and/or the service node(s) 108. In some examples, relatively distances lesser distances between node(s)/device(s) can be utilized to establish relatively lower levels of encryption/decryption, based on relatively lower security risks resulting from the lesser distances. In those or other examples, geo coordinates associated with relatively sparsely populated geographical areas can be utilized to establish relatively lower levels of encryption/decryption than for condensed geographical areas, based on relatively lower security risks in the relatively sparsely populated geographical areas.

The reasoning logic component 202 can identify the time/date value, which can be associated with a time and/or a date (e.g., a current time and/or a current date) (e.g., a time and/or a date at which the data is to be communicated). The time/date value can be associated with the client device 102(A) and/or the data that is to be transmitted by the client device 102(A). A time and/or a date of a time/date value (e.g., a first time/date value) may be different from (e.g., before or after) another time and/or date, respectively, of another time/date value (e.g., a second time/date value) at which other data is to be transmitted by the client device 102(A) or by another device or node. In some examples, time/dates associated with lower levels of network traffic can be utilized to establish relatively lower levels of encryption/decryption than for times/dates associated with higher levels of network traffic, based on relatively lower security risks resulting from time/dates associated with lower levels of network traffic.

The reasoning logic component 202 can identify a security policy (e.g., one or more encryption modes, and/or one or more decryption modes) based on the information (e.g., one or more attributes and/or one or more characteristics) associated with the client device(s) 102, and/or data being communicated for the client device(s) 102. The security policy can be associated with one or more of the client device(s) 102, the edge node(s) 104, and the service node(s) 108. By way of example, identifying the security policy can include identifying the attribute(s) and the characteristic(s), and utilizing the attribute(s) and the characteristic(s) to identify the encryption mode(s) and/or the decryption mode(s). The encryption mode(s) can include an encryption mode (e.g., a first encryption mode) associated with the client device 102(A), and/or an encryption mode (e.g., a second encryption mode) associated with the edge node 104(1). The decryption mode(s) can include a decryption mode associated with the edge node 104(1), and/or a decryption mode associated with the service node(s) 108.

Encryption identified for the client device 102(A) can be different from encryption identified for the edge node 104(1). By way of example, the first encryption mode associated with the client device 102(A) (e.g., encryption utilized for the first encryption mode tunnel 110(I)) can include a lower level of encryption (e.g., a relatively weaker encryption) than for the second encryption mode associated with the edge node 104(1) (e.g., encryption utilized for the second encryption mode tunnel 110(II)). The level of the first encryption mode associated with the client device 102(A) can be less than the level of the second encryption mode associated with the edge node 104(1), based on the attribute(s) and/or the characteristic(s). In some examples, the level of the first encryption mode associated with the client device 102(A) can be less than the level of the second encryption mode associated with the edge node 104(1), based on the first available resources level associated with the client device 102(A) being less than the second available resources level associated with the edge node 104(1). In those or other examples, the level of the first encryption mode associated with the client device 102(A) and/or communications from the client device 102(A) can be less than the level of the second encryption mode associated with the edge node 104(1) and/or communications from the edge node 104(1), based on the first potential security risk level associated with the client device 102(A) and/or communications from the client device 102(A) being less than the second potential security risk level associated with the edge node 104(1) and/or communications from the edge node 104(1).

Although the encryption utilized for transmitting data via the first encryption mode tunnel 110(I) and/or the encryption utilized for transmitting data via the second encryption mode tunnel 110(II) can be identified based on the available resources level(s) and/or the potential security risk level(s) as discussed above in the current disclosure, it is not limited as such. In some examples, the encryption utilized for the third encryption mode tunnel 110(III) can be identified in a similar way as for the encryption utilized for the first encryption mode tunnel 110(I). In those or other examples, the encryption utilized for the fourth encryption mode tunnel 110(IV) can be identified in a similar way as for the encryption utilized for the second encryption mode tunnel 110(11).

Encryption identified for the client device 102(A) and/or data stored in the client device 102(A) can be different from (e.g., less than) encryption identified for another client device (e.g., the client device 102(B)) and/or data stored in the client device 102(B). In some examples, the level of the first encryption mode (e.g., encryption utilized for the first encryption mode tunnel 110(I)) associated with the client device 102(A) and/or the data stored in the client device 102(A) can be less than the level of the second encryption mode (e.g., encryption utilized for the third encryption mode tunnel 110(III)) associated with the client device 102(B) and/or the data stored in the client device 102(A), based on the first data confidentiality level associated with the client device 102(A) being less than the second data confidentiality level associated with the client device 102(B). In those or other examples, the first distance(s) associated with the client device 102(A) may be less than the second distance(s) associated with the client device 102(B), based on the first distance(s) from the client device 102(A) and to the edge node 104(1) and/or the service node(s) 108 being less than the second distance(s) from the client device 102(B) and to the edge node 104(2) and/or the service node(s) 108. The level of the first encryption mode can be less than the level of the second encryption mode based on one or more of the first distance(s) being less than the second distance(s), respectively. In those or other examples, the level of the first encryption mode can be less than the level of the second encryption mode based on the first time/date value associated with the client device 102(A) and/or the data of the client device 102(A) being associated with a lesser security risk than the first time/date value associated with the client device 102(B) and/or the data of the client device 102(B).

Although the encryption utilized for transmitting data via the first encryption mode tunnel 110(I) and/or the encryption utilized for transmitting data via the third encryption mode tunnel 110(111) can be identified based on the data confidentiality level(s), the distance(s), and/or the time/date value(s) as discussed above in the current disclosure, it is not limited as such. In some examples, the encryption utilized for the second encryption mode tunnel 110(11) can be identified in a similar way as for the encryption utilized for transmitting data via the first encryption mode tunnel 110(I). In those or other examples, the encryption utilized for transmitting data via the fourth encryption mode tunnel 110(IV) can be identified in a similar way as for the encryption utilized for transmitting data via the third encryption mode tunnel 110(111).

Although various attributes (e.g., the available resources level(s) and/or the potential security risk level(s)) can be utilized to identify encryption for transmitting data via various tunnel(s) (e.g., the first tunnel 110(I) and the second tunnel 110(11)) as discussed above in the current disclosure, it is not limited as such. Although various attributes (e.g., the data confidentiality level(s), the distance(s), and/or the time/date value(s)) can be utilized to identify encryption for transmitting data via various tunnel(s) (e.g., the first tunnel 110(I) and the third tunnel 110(111)) as discussed above in the current disclosure, it is not limited as such. Any attribute(s) can be utilized to identify encryption for transmitting data via any of the tunnel(s) 110.

Although individual ones of the tunnel(s) can be utilized to transmit data between any device/node and any other device/node as discussed above in this disclosure, it is not limited as such. In some examples, any tunnel associated with data being communicated can be integrated with any other tunnel associated with the data being transmitted. In those examples, for instance, the first tunnel 110(I) and the tunnel 110(11) can be integrated as a single tunnel (e.g., a tunnel between the client device 102(A) and the service node(s) 108, with or without the edge node 104(1)). The single integrated tunnel utilized for the data transmitted by the client device 102(A) can be identified utilizing any of the attribute(s) and/or the characteristic(s) in a similar way as discussed above for any of the tunnel(s) 110.

Although encryption mode(s) can be identified by the reasoning logic component 202, as discussed above in the current disclosure, it is not limited as such. The decryption mode(s) (e.g., the type of decryption utilized by any device/node, such as the edge node 104(1) and/or the service node(s) 108) can be identified based on the attribute(s) and/or the characteristic(s) in a similar way as for the encryption mode(s). By way of example, a level of decryption can be utilized to decrypt data that was previously encrypted with a level of encryption; and another level (e.g., a relatively lower level) of decryption can be utilized to decrypt other data that was previously encrypted with another level (e.g., a relatively lower level) of encryption.

Figure 3:
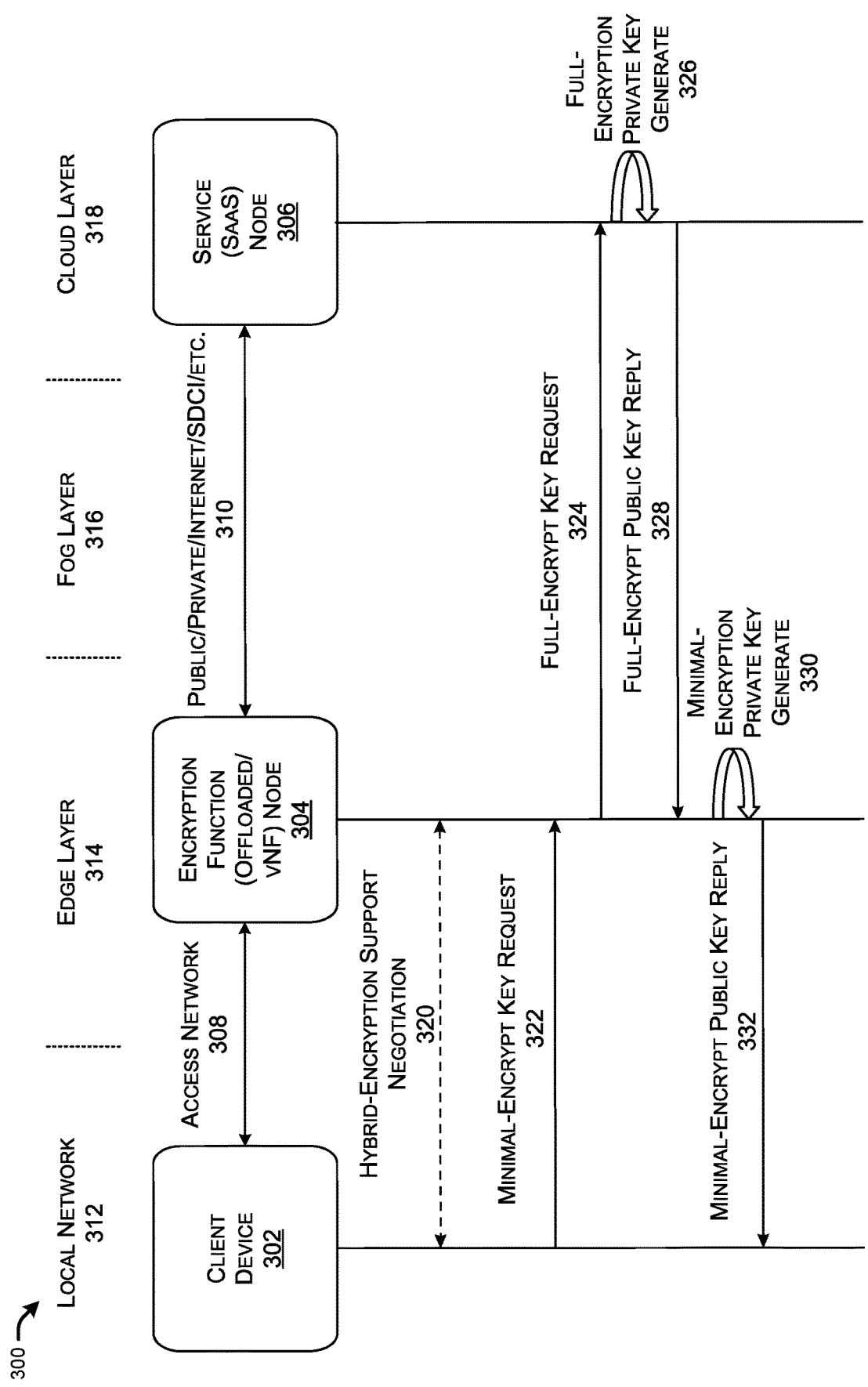
FIG. 3 illustrates a flow diagram of example communications for generating security keys for classification-based multi-segment data security management.

FIG. 3 illustrates a flow diagram 300 of example communications for classification-based multi-segment data security management. The communications can include one or more communications (or "messages" or "signals") associated with a client device 302, an encryption function (or "offloaded virtual network function (vNF)") node (or "encryption function node" or "edge node") 304, and/or a software as a service (SaaS) (or "service") node 306. In some examples, the client device 302 can be implemented as any of the client device(s) 102, the encryption function node 304 can be implemented as one or more of the access node(s) 104, and/or the service node 306 can be implemented as one or more of the service node(s) 108. The communications for the client device 302, the encryption function node 304, and the access network 308 can be processed utilizing hybrid-encryption.

The client device 302, the encryption function node 304, and the service node 306 can be communicatively interconnected by one or more networks (e.g., the network(s) discussed above with reference to FIG. 1). The client device 302 can be coupled to the encryption function node 304 via an access network 308 of the network(s). The encryption function node 304 can be coupled to the service node 306 via a public/private/internet/software-defined cloud interconnect (SDCI)/etc. network (or "network") 310 of the network(s). By way of example, the network 310 can include one or more of a public network, a private network, an internet network, an SDCI network, and any other type of network.

The client device 302, the encryption function node 304, and the service node 306 can utilize various other networks and/or network layers to exchange messages between one another. In some examples, the client device 302 can be communicatively coupled to a local network 312, which can utilize the access network 308 to communicate messages transmitted and/or received by the client device 302. In those or other examples, the encryption function node 304 can be part of (e.g., integrated within), and/or be coupled to, an edge layer 314 (e.g., the edge layer 314 can be utilized to interface between the access network 308 and the network 310). The edge layer 314, which can be implemented via one or more networks (e.g., the access network 308, the network 310, and/or one or more other networks), can be utilized to communicate messages transmitted and/or received by the encryption function node 304. In those or other examples, the encryption function node 304 can utilize a fog layer 316 to transmit messages to, and/or receive messages from, the service node 306. In those or other examples, the fog layer 316 can be positioned between the edge layer 314 and a cloud layer 318, the cloud layer 318 including, or being coupled to, the service node 306. The fog layer 316 and/or the cloud layer 318 can be implemented using one or more networks (e.g., the access network 308, the network 310, and/or one or more other networks).

The client device 302 can perform one or more hybrid-encryption support negotiations for multi-segment hybrid-encryption. In some examples, the hybrid-encryption support negotiation(s) can include a hybrid-encryption support negotiation (or "negotiation") 320 performed with the encryption function node 304. The hybrid-encryption support negotiation 320 can be performed via one or more negotiation messages (e.g., the negotiation message(s) 112(M) and/or the negotiation message(s) 112(N), as discussed above with reference to FIG. 1). The hybrid-encryption support negotiation 320 can be utilized by the client device 302 to determine a security policy (e.g., the hybrid encryption security policy, as discussed above with reference to FIGS. 1 and 2). The hybrid encryption security policy can be a multi-segment hybrid encryption security policy, with different types of security keys being generated by different devices/nodes (e.g., full-encryption keys being generated by different devices/nodes than minimal-encryption keys).

In some examples, for instance with the attribute(s) and characteristic(s) being utilized to identify a level of a security mode to be established for the access network 308 that is less than a level of a security mode to be established for the network 310, the security mode associated with the access network 308 utilizing minimal encryption can be established. In those examples, the security mode associated with the network 310 utilizing full-encryption can be established.

The security mode(s) can be identified, and encryption for communication via the network(s) can be established based on the security mode(s). The encryption utilized for communication via the access network 308 can be different from the encryption utilized for communication via the network 310. In some examples, the security policy can be identified, based on an initial mode (or "default mode") (e.g., a full-encryption mode) being utilized to communicate the same type of encryption (e.g., full-encryption) for a portion (e.g., a first portion) of a data segment via the access network 308 and the network 310; and, for a remaining portion (e.g., a second portion) of the data segment, to change to utilize (or "transition to") another mode (e.g., a hybrid-encryption mode) for hybrid-encryption (e.g., a mode with encryption (e.g., minimal-encryption) for communication via the access network 308 being different from encryption (e.g., full-encryption) for communication via the network 310). In other examples, an entire portion of the data segment can be transmitted utilizing a security policy with any type of encryption (e.g., hybrid-encryption via a hybrid-encryption mode).

The security policy (e.g., the hybrid-encryption multi-segment security policy) utilizing hybrid-encryption that is identified via the negotiation can be utilized to communicate (or "exchange") one or more messages (e.g., one or more of the negotiation messages 112) associated with identification and/or communication of one or more security keys. The message(s) associated with security key(s) can include a minimal-encrypt key request 322. The client device 302 can transmit the minimal-encrypt key request 322 to the encryption function node 304 based on completion of the hybrid-encryption support negotiation 320. The minimal-encrypt key request 322 can be utilized to request a minimal-encrypt key (e.g., a minimal-encrypt public key).

The message(s) associated with security key(s) can include a full-encrypt key request 324. The encryption function node 304 can transmit the full-encrypt key request 324 to the service node 306. The full-encrypt key request 324 can be utilized to request a full-encrypt key (e.g., a minimal-encrypt public key).

The service node 306 can generate a full-encrypt private key. The service node 306 can perform a full-encryption private key generate process (or "full-encryption private key generate") 326 to generate the full-encrypt private key and a full-encrypt public key (e.g., a full-encrypt public key generated utilizing the full-encrypt private key). In some examples, the full-encrypt private key and/or the full-encrypt public key can be generated based on the full-encrypt key request 324.

The message(s) associated with security key(s) can include a full-encrypt public key reply 328. The service node 306 can transmit the full-encrypt public key reply 328 to the encryption function node 304. The full-encrypt public key reply 328 can be utilized, based on the full-encryption private key generate 326, as a reply message with a full-encrypt key (e.g., a full-encrypt public key).

The encryption function node 304 can generate a minimal-encrypt private key via a minimal-encryption private key generate 330. In some examples, the minimal-encrypt private key and a minimal-encrypt public key (e.g., a minimal-encrypt public key generated utilizing the minimal-encrypt private key) can be generated. In some examples, the minimal-encrypt private key and/or the minimal-encrypt public key can be generated based on the full-encrypt public key reply 328.

The message(s) associated with security key(s) can include a minimal-encrypt public key reply 332. The encryption function node 304 can transmit the minimal-encrypt public key reply 332 to the client device 302. The minimal-encrypt public key reply 332 can be utilized as a reply message with a minimal-encrypt key (e.g., a minimal-encrypt public key).

The client device 302, the encryption function node 304, and the service node 306 can utilize the keys to transmit data (e.g., a segment of data stored in the client device 302). The client device 302 can utilize the minimal-encrypt public key to encrypt the data, as encrypted data (e.g., data encrypted utilizing minimal encryption). The client device 302 can transmit the data encrypted utilizing minimal encryption to the encryption function node 304, which can utilize the minimal-encrypt private key to decrypt the data to obtain the original data (e.g., the data to be transmitted by the client device 302 prior to any encryption). The encryption function node 304 can utilize the full-encrypt public key to encrypt the data, as encrypted data (e.g., data encrypted via full encryption). The encryption function node 304 can transmit the data encrypted utilizing full encryption to the service node 306. The service node 306 can decrypt the data utilizing the full-encrypt private key to obtain the original data.

Figure 4:
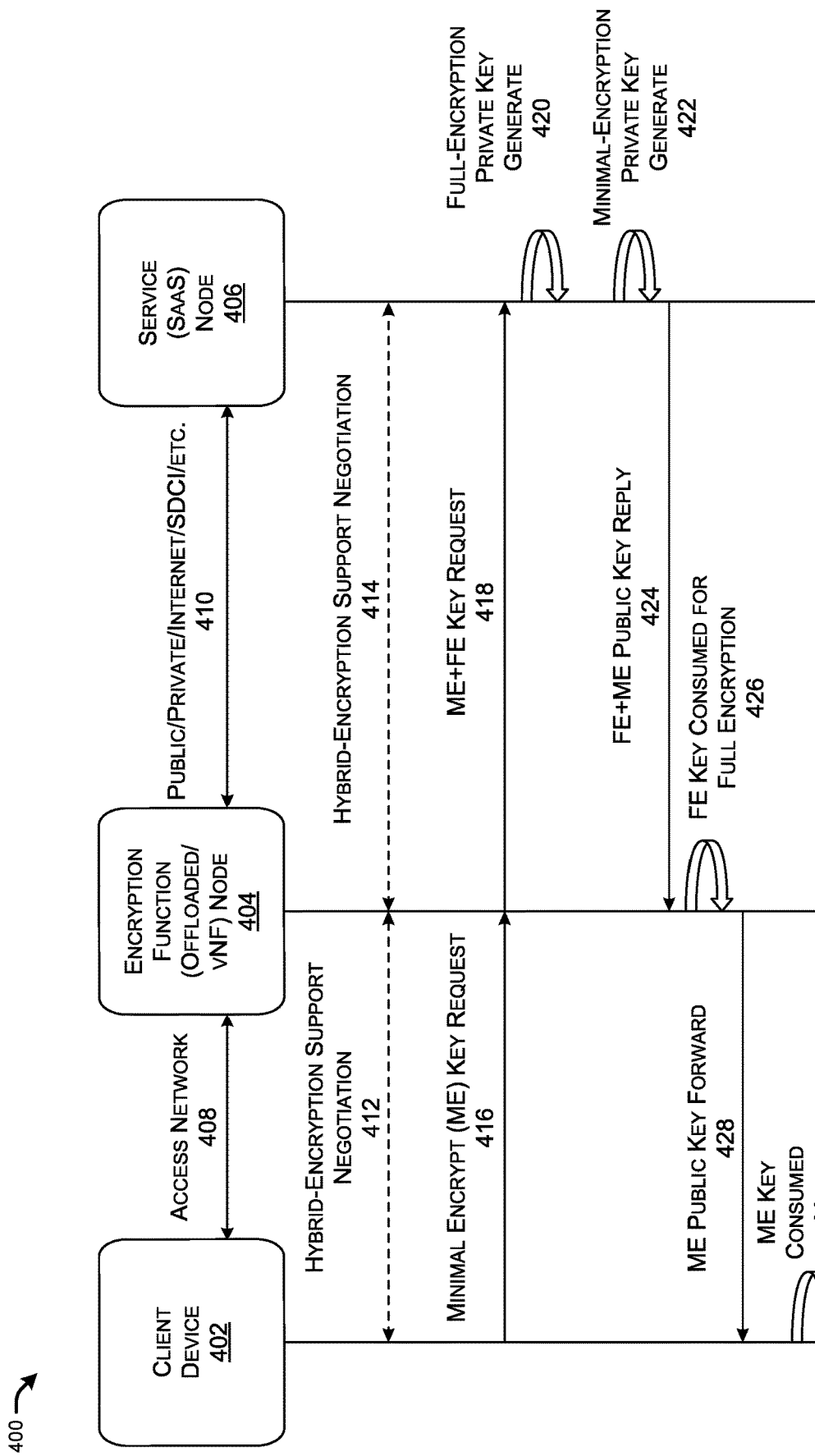
FIG. 4 illustrates a flow diagram of example communications for generating security keys for classification-based multi-stage data security management.

FIG. 4 illustrates a flow diagram 400 of example communications for classification-based multi-stage data security management. The communications can include one or more communications associated with a client device 402, an encryption function (or "offloaded virtual network function (vNF)") node (or "encryption function node" or "edge node") 404, and/or a software as a service (SaaS) (or "service") node 406. In some examples, the client device 402 can be implemented as any of the client device(s) 102, the encryption function node 404 can be implemented as any of the access node(s) 104, and/or the service node 406 can be implemented as any of the service node(s) 108. The communications for the client device 402, the encryption function node 404, and the access network 408 can be processed utilizing hybrid-encryption. The client device 402, the encryption function node 404, and the service node 406 can be communicatively interconnected by one or more networks (e.g., the network(s) discussed above with reference to FIG. 1), which can include an access network 408 and a public/private/internet/software-defined cloud interconnect (SDCI)/etc. network (or "network") 410. In some examples, the access network 408 can be implemented in a similar way as the access network 308; and the access network 408 can be implemented in a similar way as the access network 308.

The client device 402 can perform one or more hybrid-encryption support negotiations for multi-stage hybrid-encryption. In some examples, the hybrid-encryption support negotiation(s) performed can include a hybrid-encryption support negotiation 412 that is performed by the client device 402 and with the encryption function node 404. In those examples, the hybrid-encryption support negotiation(s) can include a hybrid-encryption support negotiation 414 being performed by the encryption function node 404 and with the service node 406. The hybrid-encryption support negotiation 412 and/or the hybrid-encryption support negotiation 414 can be utilized by the client device 302 to determine a security policy (e.g., the hybrid encryption security policy, as discussed above with reference to FIGS. 1 and 2), in a similar way as for the security policy determined via the hybrid-encryption support negotiation 320, as discussed above with reference to FIG. 3, except with different types of security keys being generated by the same node/device (e.g., full-encryption keys and minimal-encryption keys being generated by the service node 406).

The security policy (e.g., the hybrid-encryption multi-stage security policy) utilizing hybrid-encryption that is identified via the negotiation can be utilized to communicate one or more messages (e.g., one or more of the negotiation messages 112) associated with identification and/or communication of one or more security keys. The message(s) associated with security key(s) can include a minimal-encrypt (ME) key request 416. The ME key request 416 can be implemented in a similar way as the ME key request 322. The ME key request 416 can be transmitted based on completion of the hybrid-encryption support negotiation 412 and the hybrid-encryption support negotiation 414. One or more identifiers (or "indexes") indicating corresponding encryption type(s) (e.g., an identifier indicating an encryption type associated with communications between the client device 402 and the encryption function node 404, an identifier indicating an encryption type associated with communications between the encryption function node 404 and the service node 406, etc.) can be stored in any node/device (e.g., the encryption function node 404) having completed identification of the encryption via reasoning logic of the reasoning logic component 202. The identifier(s) can be stored in individual databases of the corresponding node(s)/device(s).

The message(s) associated with security key(s) can include an ME+full-encrypt (FE) key request 418. The ME+FE key request 418 can be implemented in a similar way as the full-encrypt key request 324 as discussed above with reference to FIG. 3, except with the ME+FE key request 418 being utilized to request an ME key (e.g., an ME public key) and an FE key (e.g., an FE public key).

The service node 406 can generate a FE private key and an ME private key. The service node 406 can perform a full-encryption private key generate process (or "full-encryption private key generate") 420, similar to the full-encryption private key generate") 326 as discussed above with reference to FIG. 3, except with the full-encryption private key generate process 420 being performed by the service node 406. In some examples, the FE private key, the FE public key, the ME private key, and/or the ME public key can be generated based on the ME+FE key request 418. The service node 406 can perform a minimal-encryption private key generate 422, similar to the minimal-encryption private key generate 330 as discussed above with reference to FIG. 3, except with the minimal-encryption private key generate 422 being performed by the service node 406.

The message(s) associated with security key(s) can include an FE+ME public key reply 424. The FE+ME public key reply 424 can be implemented in a similar way as the full-encrypt public key reply 328 as discussed above with respect to FIG. 3, except with the FE+ME public key reply 424 including the FE public key and the ME public key.

The encryption function node 404 can perform an FE key consumed for full encryption process (or "FE key consumed for full encryption") 426 to utilize the FE public key according to the multi-stage hybrid-encryption mode. The FE key consumed for full encryption 426 can be utilized to store the FE public key in the encryption function node 404.

The message(s) associated with security key(s) can include an ME public key forward process (or "ME public key forward") 428. The ME public key forward 428 can be implemented in a similar way as the minimal-encrypt public key reply 332 as discussed above with respect to FIG. 3, except with the ME public key in the ME public key forward 428 being received and forwarded by the encryption function node 404. The encryption function node 404 can receive and forward the ME public key, instead of generating the ME public key, based on the ME public key having been generated by the service node 406 instead of by the encryption function node 304.

The client device 402, the encryption function node 404, and the service node 406 can utilize the keys to transmit data (e.g., a segment of data stored in the client device 402). The client device 402 can utilize the ME public key to encrypt the data, as encrypted data (e.g., data encrypted utilizing minimal encryption). The client device 402 can transmit the data encrypted utilizing minimal encryption to the encryption function node 404, which can utilize the FE public key to encrypt the data, as encrypted data (e.g., data encrypted utilizing minimal encryption, and additionally (or "cumulatively") utilizing full encryption). The encryption function node 404 can transmit the data encrypted utilizing minimal encryption and full encryption to the service node 406. The service node 406 can decrypt the data utilizing the FE private key, and subsequently decrypt the data utilizing the ME private key.

Therefore, and as described herein, generation of security keys can be performed by the encryption function node(s) or the service node(s). Utilizing the service node(s) (e.g., the service node 406) to generate the security keys, including the FE public key, the FE private key, the ME public key, and the ME private key, can provide a level of security and/or effectiveness of resource utilization that is greater than for utilizing the encryption function node 404 to generate one or more of the keys. The service node 406 may have a greater amount of available resources than the encryption function node 404. The network(s) (e.g., the network 410) utilized for communication between the edge node 404 and the service node 406 may require a level of security that is greater than for the network(s) (e.g., the network 408) utilized for communication between the client device 402 and the encryption function node 404.

In some examples, for instance with the FE private key and the ME private key being generated by the service node 406, the FE public key can be utilized by the encryption function node 404 to encrypt data having been previously encrypted and transmitted by the client device 402, to provide a level of protection of data confidentially that is greater than for the encryption function node 304, as discussed above with respect to FIG. 3. Because the FE private key and the ME private key are stored in the service node 406, the encryption function node 404 does not have the decrypt the data received from the client device 402 prior to encrypting the data with the FE public key. Whereas the encryption function node 304 is utilized to decrypt the data received from the client device 302 prior to encrypting the data with the FE public key.

Figure 5:
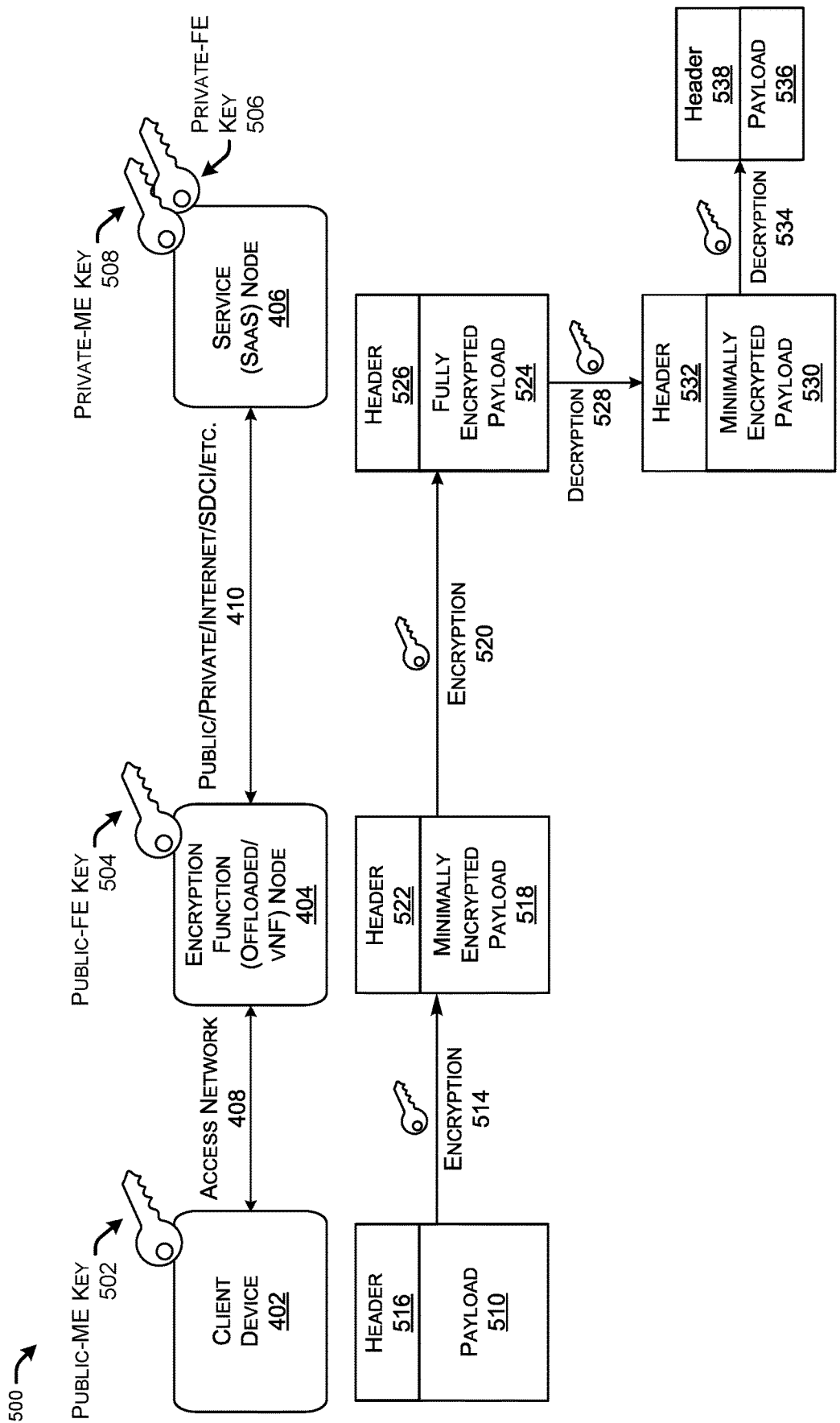
FIG. 5 illustrates a flow diagram of example communications for transmitting data utilizing classification-based multi-stage data security management.

FIG. 5 illustrates a flow diagram 500 of example communications for transmitting data utilizing classification-based multi-stage data security management. The communications can include one or more communications associated with the client device 402, the encryption function node 404, and/or the service node 406, which can be communicatively interconnected by the network(s) (e.g., the access network 408 and the network 410), as discussed above with reference to FIG. 4.

The service node 406 can generate the ME public key (e.g., a public-ME key 502), the FE public key (e.g., a public-FE key 504), the FE private key (e.g., a private-FE key 506), and the ME private key (e.g., a private-ME key 508), as discussed above with reference to FIG. 4. The service node 406 can transmit the public-ME key 502 to the client device 402, and transmit the public-FE key 504 to the encryption function node 404.

The client device 402 can utilize the classification-based multi-stage data security management to transmit data (e.g., a segment of data) (or "payload") 510, from among data (e.g., an entire portion of data) stored in the client device 402. The client device 402 can perform encryption 514 to encrypt the payload 510 utilizing the public-ME key 502. The client device 402 can identify a header 516. In some examples, the client device 402 can generate the header 516 based on a security policy (e.g., a hybrid-encryption multi-stage security policy) that is identified, as discussed above with reference to FIGS. 1, 2, and 4. The payload 510 having been encrypted utilizing the public-ME key 502 can be transmitted by the client device 402 and to the encryption function node 404. The header 516 and the payload 510 having been encrypted utilizing the public-ME key 502 can be transmitted together.

The encryption function node 404 can receive the payload 510 as a minimally encrypted payload 518, and store the minimally encrypted payload 518. The encryption function node 404 can utilize the classification-based multi-stage data security management to perform encryption 520 to encrypt the minimally encrypted payload 518 utilizing the public-FE key 504. The encryption function node 404 can identify a header 522. In some examples, the encryption function node 404 can generate the header 522 based on the hybrid-encryption multi-stage security policy. The payload 518 having been encrypted utilizing the public-FE key 504 can be transmitted by the encryption function node 404 and to the service node 406. The header 522 and the payload 518 having been encrypted utilizing the public-FE key 504 can be transmitted together.

The service node 406 can receive the payload 518 as a fully encrypted payload (e.g., a minimally and full encrypted payload) 524, and store the fully encrypted payload 524. The service node 406 can utilize the classification-based multi-stage data security management to perform decryption 528 to decrypt the fully encrypted payload 524 with the private-FE key 506. The service node 406 can identify a header 526 associated with the fully encrypted payload 524 having been decrypted utilizing the private-FE key 506.

The service node 406 can store, as a minimally encrypted payload 530, the fully encrypted payload 524 having been decrypted utilizing the private-FE key 506. The service node 406 can utilize the classification-based multi-stage data security management to perform decryption 534 to decrypt the minimally encrypted payload 530 with the private-ME key 508. The service node 406 can store, as a payload 536, the minimally encrypted payload 530 having been decrypted utilizing the private-ME key 508. The service node 406 can identify a header 538 associated with the payload 536. The payload 536 can be the same, and include the same data, as the payload 510 prior to the encryption 514 having been performed.

Figure 6:
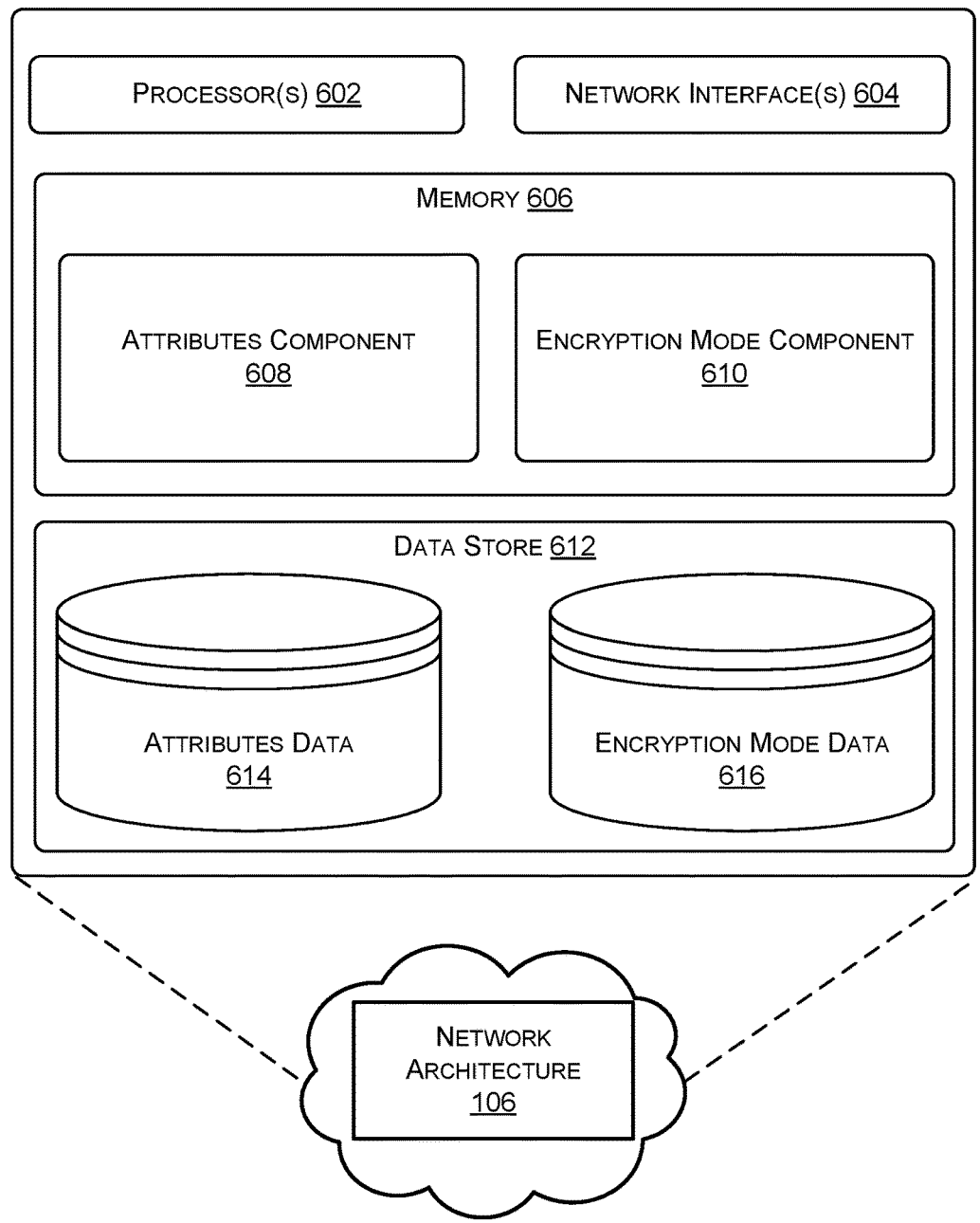
FIG. 6 illustrates a computing system diagram illustrating a configuration for a data center that can be utilized to implement aspects of the technologies disclosed herein.

FIG. 6 illustrates a computing system diagram 600 illustrating a configuration for a data center that can be utilized to implement aspects of the technologies disclosed herein.

Generally, the network architecture 106, which may be implemented as one or more servers (or "nodes") (e.g., a server), may include a programmable controller that manages some or all of network activities (e.g., activities performed by the edge node(s) 106). As illustrated, the network architecture 106 may include, or run on, one or more hardware processors 602 (processors), one or more devices, configured to execute one or more stored instructions. The processor(s) 602 may comprise one or more cores. Further, the network architecture 106 may include or be associated with (e.g., communicatively coupled to) one or more network interfaces 604 configured to provide communications with the client devices 102, the edge nodes 104, and other devices, and/or other systems or devices in the network architecture 106 and/or remote from the network architecture 106. The network interface(s) 604 may include devices configured to couple to personal area networks (PANs), wired and wireless local area networks (LANs), wired and wireless wide area networks (WANs), and so forth. For example, the network interface(s) 604 may include devices compatible with any networking protocol.

The network architecture 106 may also include memory 606, such as computer-readable media, that stores various executable components (e.g., software-based components, firmware-based components, etc.). The memory 606 may generally store components to implement functionality described herein as being performed by the network architecture 106. The memory 606 may store an attributes component 608 configured to manage one or more attributes, as discussed above with reference to FIGS. 1 and 2 (e.g., device resource availability(ies) (e.g., device resource availability value(s)), access trust score(s), data confidentiality score(s), geo coordinate(s) (e.g., geo coordinates value(s)), and/or time/date value(s)). The attributes component 608 and/or another component in the memory 606 may manage other data associated with security management for node/devices, such as characteristic(s) associated with the nodes/devices and/or data communicated therefor, as discussed above with reference to FIGS. 1 and 2.

Further, the memory 606 may store an encryption mode component 610. The encryption mode component 610 can be utilized to store one or more identifiers indicating the security policy, and/or one or more portions of the security policy (e.g., security mode(s), encryption mode(s), decryption mode(s), etc., associated with individual ones of the node(s), device(s), and/or network(s)). In some examples, the encryption mode component 610 can identify, from among various types of security policies, the security policy as a multi-segment security policy (e.g., a security policy utilizing multi-segment hybrid encryption), a multi-stage security policy (e.g., e.g., a security policy utilizing multi-stage hybrid encryption), etc. The encryption mode component 610 can receive, from a node/device (e.g., the client device 102(A), the edge node 104(1), etc.), a security policy identifier generated by the node/device, the security policy identifier indicating a type of security policy, and manage at least some of the security operations associated with the security policy.

The network architecture 106 may further include a data store 612, such as long-term storage, that stores attributes data 614 including the attribute(s). The data store 612 may store encryption mode data 616 that indicates the security policy (e.g., the identifier(s)/index(es) associated with the security policy).

Although the network architecture 106 is discussed above in the current disclosure, it is not limited as such. In some examples, any devices and or nodes (e.g., the edge node(s) 104) can be implemented in a similar way as for the network architecture 106. By way of example, the client device(s) 102, the edge node(s) 104, and/or the service node(s) 108, individually or in combination, can include memory, a data store, etc., to manage and/or store the reasoning logic component 202, the characteristic(s), etc.

In some instances, the steps of method 600 may be performed by a device and/or a system of devices that includes one or more processors and one or more non-transitory computer-readable media storing computer-executable instructions that, when executed by the one or more processors, cause the one or more processors to perform operations of method 600.

Figure 7:
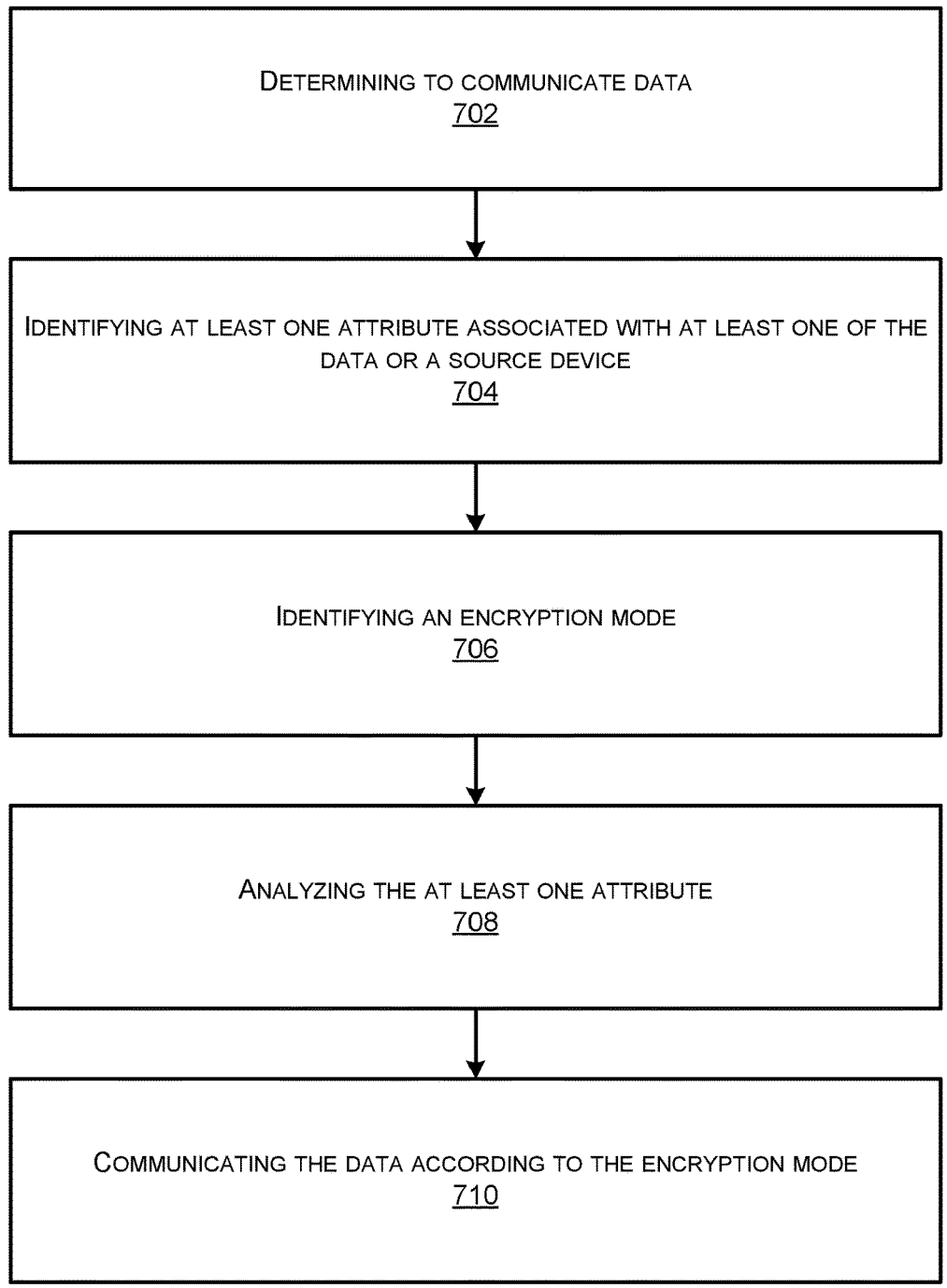
FIG. 7 illustrates a flow diagram of an example method for classification-based data security management.

FIG. 7 illustrates a flow diagram 700 of an example method for classification-based data security management.

At 702, a source device can determine to communicate data to a destination device (e.g., a service node 108). The source device (e.g., a client device 102(A)) can identify the data (e.g., a data segment) (e.g., a payload) from among an entire amount of data stored on the client device 102(A).

At 704, the client device 102(A) can identify at least one attribute associated with at least one of the data or the client device 102(A). The at least one attribute can include a resource availability value, an access trust score, a data confidentiality score, geo coordinates, and/or a time/date value. The client device 102(A) can identify one or more characteristics (e.g., a type of the device and/or a type of the data)) associated with the client device(s) 102 and/or a segment of data (or "data segment" or "data") (e.g., data to be communicated for the client device 102(A)).

At 706, the client device 102 can analyze the at least one attribute. The at least one attribute can be utilized to identify a security policy. The security policy can include encryption of the same or different types for different communications (e.g., a communication between the client device 102(A) and the edge node 104(1), a communication between the edge node 104(1) and the service node 108, etc.).

At 708, the client device 102(A) can, based at least in part on the analyzing, identify an encryption mode from amongst a group of encryption modes. The encryption mode can be utilized to encrypt data between the client device 102(A) and the service node 108. The encryption mode can include minimal-encryption between the client device 102(A) and the edge node 104(1), and full-encryption between the edge node 104(1) and the service node 108.

At 710, the client device 102(A) can communicate the data to the service node 108, via the edge node 104(1), according to the encryption mode. The data can be communicated by utilizing security keys (e.g., minimal-encrypt keys and full-encrypt keys). The security keys can be utilized to encrypt the data utilizing a hybrid encryption policy, based on the attribute(s) and the characteristic(s).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A network device, comprising:
one or more processors; and
one or more non-transitory computer-readable media storing computer-executable instructions that, when executed by the one or more processors, cause the one or more processors to perform operations comprising:
receiving data traffic generated by a source device;
identifying at least one of an access trust score indicating a security risk associated with the data traffic or a data confidentiality score indicating a measure of confidentiality of data in the data traffic;
classifying the data traffic with a classification based on the at least one of the access trust score or the data confidentiality score;
identifying, using the classification, an encryption mode from amongst first and second encryption modes, the first encryption mode resulting in more of the data traffic being encrypted than the second encryption mode; and
transmitting, to the source device, an indication that the source device is to use the encryption mode from amongst the first and second encryption modes.

2. The network device of claim 1, wherein the security risk indicated by the access trust score comprises a likelihood associated with a security attack to at least one of a client device or a network to which the client device is connected, and the likelihood is utilized to predict unknown attack vectors for exploiting one or more cybersecurity vulnerabilities of the client device.

3. The network device of claim 1, wherein classifying the data traffic further comprises:
classifying the data traffic further based on a date and a time associated with a request transmitted by the source device.

4. The network device of claim 1, wherein the encryption mode is a minimal-encryption mode, a first index and a second index are stored in a database, the first index indicates the minimal-encryption mode to be utilized by the source device, the second index indicating a full-encryption mode to be utilized for routing, by an access device, the data received utilizing the minimal-encryption mode.

5. The network device of claim 1, wherein the source device is configured to transmit first data and second data, the encryption mode is a minimal-encryption mode to be utilized by the source device to encrypt the first data, the first data is measurement data, the second data is encrypted by the source device according to a full-encryption mode, and the second data is login data.

6. The network device of claim 1, the operations further comprising:
generating a full-encryption private key usable for decrypting data having been encrypted with full-encryption;
generating a minimal-encryption private key usable for decrypting the data having been encrypted with minimal-encryption;
receiving encrypted data; and
decrypting the encrypted data using the full-encryption private key, and then using the minimal-encryption private key.

7. The network device server of claim 1, the operations further comprising:
receiving the data encrypted with minimal encryption;
decrypting the data using a the minimal-encryption private key;
encrypting the data using a full-encryption public key; and
transmitting the data encrypted with full-encryption.

8. A method performed at least partly by a network device, the method comprising:
receiving data traffic generated by a source device;
identifying at least one of an access trust score indicating a security risk associated with the data traffic or a data confidentiality score indicating a measure of confidentiality of data in the data traffic;
classifying the data traffic with a classification based on the at least one of the access trust score or the data confidentiality score;
identifying, using the classification, an encryption mode from amongst first and second encryption modes, the first encryption mode resulting in more of the data traffic being encrypted than the second encryption mode; and
communicating data in the data traffic with a destination device according to the encryption mode.

9. The method of claim 8, wherein the security risk indicated by the
access trust score comprises a likelihood associated with a security attack to at least one of a client device or a network to which the client device is connected, and the likelihood is utilized to predict unknown attack vectors for exploiting one or more cybersecurity vulnerabilities of the client device.

10. The method of claim 8, wherein the encryption mode is a minimal-encryption mode, further comprising:
transmitting a minimal-encryption public key utilized for encryption of the data.

11. The method of claim 8, wherein the encryption mode is a minimal-encryption mode, further comprising:
generating a minimal-encryption public key;
routing the data being previously encrypting using the minimal-encryption public key.

12. The method of claim 8, wherein the encryption mode is identified based at least in part on a multi-segment hybrid encryption configuration established by a service device, and the multi-segment hybrid encryption configuration is different from a multi-stage hybrid encryption configuration established by the service device responsive to second data communicated by a second source device.

13. The method of claim 8, wherein
an identifier of the encryption mode is stored in a database of the source device.

14. The method of claim 8, wherein
a first portion of the data is communicated via a full-encryption mode,
the encryption mode is a hybrid-encryption mode, and
a second portion of the data is communicated via the hybrid-encryption mode.

15. A security system, comprising:
one or more processors; and
one or more non-transitory computer-readable media storing computer-executable instructions that, when executed by the one or more processors, cause the one or more processors to perform operations comprising:
receiving data traffic generated by a source device;
identifying at least one of an access trust score indicating a security risk associated with the data traffic or a data confidentiality score indicating a measure of confidentiality of data in the data traffic;
classifying the classifying the data traffic with a classification based on the at least one of the access trust score or the data confidentiality score;

identifying, using the classification, an encryption mode from amongst first and second encryption modes, the first encryption mode resulting in more of the data traffic being encrypted than the second encryption mode;

communication data in the data traffic with a destination device according to the encryption mode.

16. The security system of claim 15, wherein a first level of security of the first encryption mode is different from a second level of security of the second encryption mode.

17. The security system of claim 15, wherein a first level of security of the first encryption mode is lower than a second level of security of the second encryption mode.

18. The security system of claim 15,
wherein the first encryption mode is utilized:
based at least in part on completion of a hybrid-encryption support negotiation performed with a service device.

19. The security system of claim 15,
wherein the first encryption mode is utilized based at least in part on completion of a hybrid-encryption support negotiation, the data being initially encrypted according to the first encryption mode and the encrypted according to the second encryption mode.

20. The security system of claim 15, wherein the first encryption mode is utilized based at least in part on completion of a hybrid-encryption support negotiation, and via a minimal-encryption public key.

* * * * *